United States Patent Office 3,355,893
Patented Dec. 5, 1967

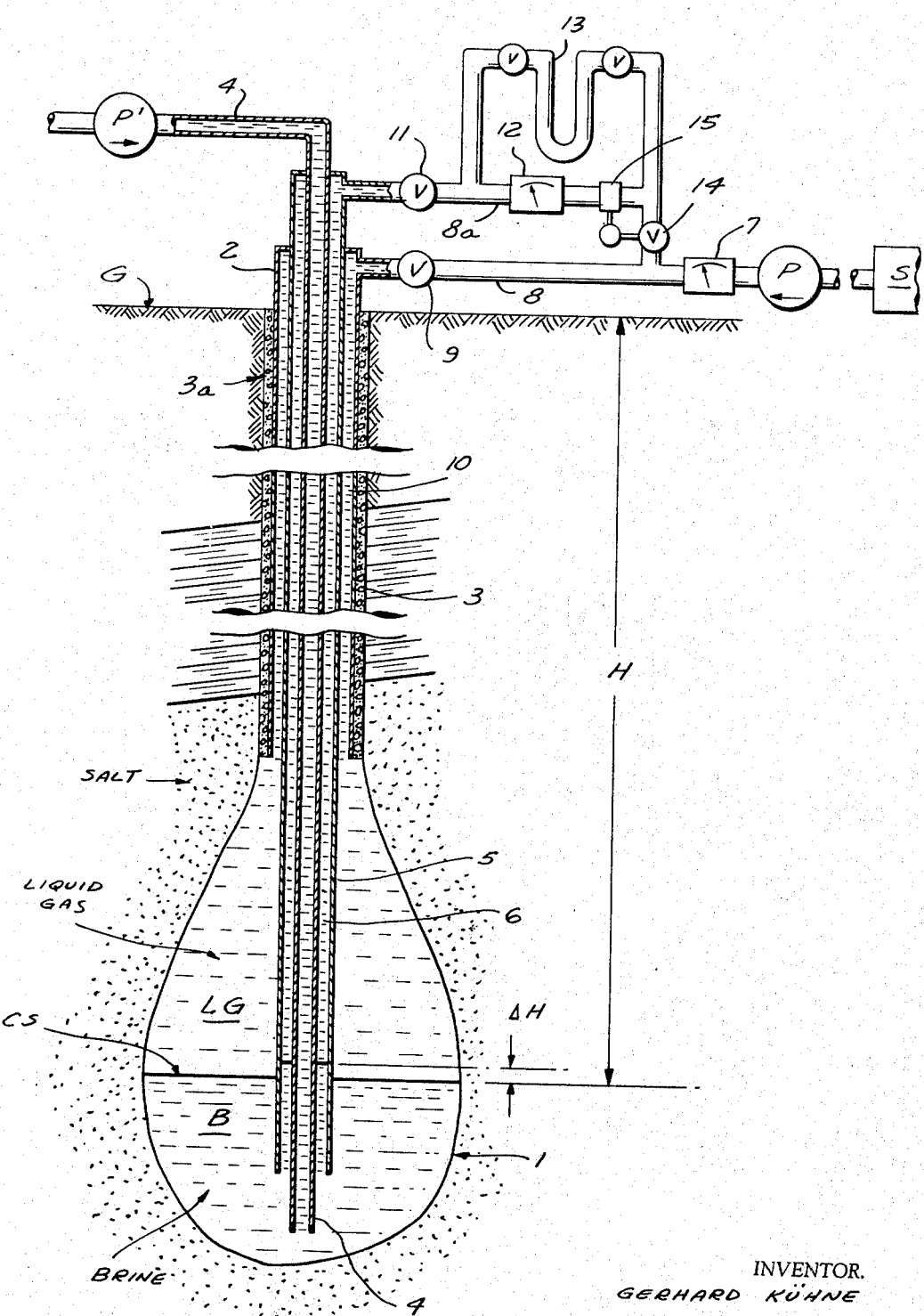

3,355,893
APPARATUS FOR LOCATING THE CONTACT SURFACE BETWEEN LIGHTER AND HEAVIER LIQUIDS IN UNDERGROUND CAVERNS
Gerhard Kuhne, Pinneberg, Germany, assignor to Deutsche Erdol-Aktiengesellschaft Hamburg, Hamburg, Germany
Filed Mar. 22, 1966, Ser. No. 536,447
Claims priority, application Germany, Mar. 25, 1965, D 46,895
18 Claims. (Cl. 61—.5)

The present invention relates to an apparatus for locating the contact surface between two fluids in underground caverns. More particularly, the invention relates to an apparatus which may be utilized to locate or determine the exact level of contact surface between a body of brine and a body of liquid gas which floats on brine.

It is already known to store liquid gas in caverns which are formed by dissolving and washing out rock salt from underground deposits. In forming an underground cavern, a bore is drilled into the ground so that its blind end terminates in the salt deposit which was selected for storage of liquid gas. The bore is lined with sections of piping and such sections are embedded in a mass of concrete which is allowed to set and then forms a fluid-tight seal around the piping. In the next step, the crew introduces into the thus obtained tubular liner a pair of freely suspended concentric conduits or pipes one of which serves to admit fresh water and the other of which discharges brine. The stream of fresh water can be admitted through the inner conduit and the resulting brine is discharged through the annular passage surrounded by the outer conduit. The direction of flow through the conduits may be reversed, either continuously or from time to time, in order to impart to the resulting underground cavern a desired shape.

When the formation of the cavern is completed, one of the two concentric conduits is withdrawn. In response to pumping of liquid gas through the annular space surrounding the remaining conduit, a corresponding amount of brine is expelled through such remaining conduit whereby the thus introduced liquid gas floats on remaining brine in the cavern. In order to withdraw liquid gas from the supply which has been stored in the cavern, the operation is reversed, i.e., brine is pumped through the remaining conduit so that liquid gas issues from the annular space between the remaining conduit and the tubular liner. Since the specific weight of liquid gas is lower, it floats on brine. The level of the contact surface between liquid gas and brine is indicative of the extent to which the underground cavern is filled with liquid gas.

A serious problem which arises in such operations is that the personnel in charge does not know the exact level of contact surface between the two liquids. In other words, it is difficult to determine the extent to which the cavern is filled with liquid gas. Heretofore known proposals to locate the contact surface include the provision of radioactive floats, specially constructed differential pressure meters and similar costly, complicated but unreliable measuring devices.

Accordingly it is an important object of the present invention to provide a novel apparatus which can be installed in underground storing facilities for liquid gas and which is constructed and assembled in such a way that it can furnish accurate readings as to the exact location of contact surface between liquid gas and brine.

Another object of the invention is to provide an apparatus of the just outlined characteristics which can be readily installed in existing underground storage facilities for liquid gas.

A further object of the invention is to assemble such apparatus of a small number of simple component parts.

Briefly stated, one feature of my present invention resides in the provision of an apparatus for locating the contact surface between lighter and heavier fluids in underground caverns wherein first and second conduits respectively extend downwardly into a cavern below and above the surface of the heavier fluid. The apparatus comprises a third conduit which is preferably surrounded by the second conduit and surrounds the first conduit. This third conduit has a predetermined (known) volume and dips into the heavier fluid. The second and third conduits are arranged to convey lighter fluid and the first conduit is arranged to convey heavier fluid whereby the combined amount of lighter fluid which is admitted into or evacuated from the cavern through the second and third conduits equals the amount of heavier fluid which is evacuated from or admitted into the cavern through the first conduit and the level of contact surface between the fluids in the third conduit at least approximates the level of contact surface in the cavern. The apparatus further comprises suitable flow meter means for determining the total amount of lighter fluid which flows into or from the third conduit so that the extent to which the third conduit is filled with lighter fluid allows for determination of such levels. This will be readily understood since, by determining the total amount of lighter fluid which has been admitted into the third conduit, and by knowing the volume and the length of the third conduit, one can immediately calculate the exact distance between the ground level or a selected reference level and the level of the contact surface between the two fluids in the third conduit which is normally tantamount to determination of the contact surface between the two fluids in the cavern proper.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of a specific embodiment with reference to the accompanying drawing the single illustration of which is a central vertical section through an apparatus which embodies the present invention.

Referring to the drawing in detail, there is shown an underground cavern 1 which has been formed in a deposit of rock salt. The upper part of the cavern 1 is filled with liquid gas LG and the lower part of the cavern is filled with brine B. A first conduit 2, here shown as a tubular liner consisting of several end-to-end arranged sections, extends from the ground level G to the uppermost zone of the cavern 1 and is surrounded by a layer of hardened concrete 3. The conduit 2 is introduced into a vertical bore 3a which was drilled into the ground so that it terminates in the salt deposit. Such drilling operation is carried out in a first step, i.e., prior to formation of the cavern 1.

Brine can be admitted or evacuated through a second conduit or pipe 4 which is freely suspended in the interior of the conduit 2 so that its lower end extends to a level below the contact surface CS between the liquids LG and B in the cavern 1. It will be seen that the lower end of the conduit 4 actually extends close to the deepmost zone of the cavern. The conduit 4 is surrounded by a third conduit or pipe 5 which is preferably concentric therewith (as well as with the conduit 2) and also extends to a level below the contact surface CS. Alternatively, the conduit 5 may be adjacent to (to wit: it need not surround) the conduit 4. The length of the conduits 4 and 5 is about the same, i.e., each of these conduits can extend to the bottom zone of the cavern 1. The annular space or passage 6 between the conduits 4 and 5 is of circular cross-sectional outline and its exact volume is known because such volume can be calculated by determining the volumetric contents of the conduit 5 and by deducting therefrom the space taken up by the conduit 4.

When the cavern 1 is to receive a certain amount of liquid gas LG, such liquid gas is admitted under pressure by a pump P which draws from a suitable source S. The pump P is installed in a feed conduit 8 upstream of a suitable flow meter 7. The latter is mounted upstream of a shutoff valve 9, and the feed conduit 8 is connected with the conduit 2 above the ground level G. Liquid gas then flows through an annular passage 10 between the conduits 2 and 5 to expel from the cavern 1 an equal amount of brine B which issues from the upper end of the innermost conduit 4. Since the liquid gas LG is lighter than brine B, it floats on brine and the contact surface CS descends in response to continued introduction of liquid gas through the passage 10. For example, at a certain stage of the pumping operation, the contact surface CS will be located at a distance H from the ground level G and the purpose of my improved apparatus (which includes the conduit 5) is to determine with requisite accuracy the distance H so that the personnel in charge will be able to know the extent to which liquid gas fills the cavern 1.

The apparatus further comprises a shutoff valve 11 which is installed in a branch conduit 8a connecting the upper end of the conduit 5 with the feed conduit 8 between the flow meter 7 and shutoff valve 9. If the valve 11 is opened while the pump P forces liquid gas through the feed conduit 8 and valve 9, a certain amount of liquid gas will flow through the branch conduit 8a and will enter the annular passage 6 between the conduits 4, 5 to expel an equal amount of brine through the lower end of the conduit 5. The contact surface between liquid gas and brine in the passage 6 will tend to assume the same level as the contact surface CS in the cavern 1, namely, at the distance H from the ground level G. A second flow meter 12 which is installed in the branch conduit 8a measures the amount of liquid gas which enters the passage 6 and, by knowing the exact volume of the passage 6, the amount of liquid gas which enters this passage via valve 11, and the length of the conduit 5, the operator can readily determine the distance H.

Many presently utilized underground storage facilities for liquid gas are provided with very large caverns. For example, liquid gas can be stored economically in caverns having a volume of several thousand and up to one hundred thousand cubic meters. Therefore, the volume of the passage 6 between the conduits 4 and 5 is relatively small (as compared with the volume of the cavern 1). The amount of liquid gas which flows through the flow meter 12 per unit of time depends mainly on the configuration of the cavern 1 provided, of course, that the rate at which the pump 7 supplies liquid gas to the feed conduit 8 and hence to the annular passage 10 remains constant. In other words, and assuming that the rate at which the pump P forces liquid gas into the passage 10 remains constant, the amount of liquid gas which passes through the flow meter 12 per unit of time will be less if the cross-sectional area of the cavern 1 at the momentary level of the contact surface CS is larger. On the other hand, the flow meter 12 will count a greater amount of liquid gas if the rate of liquid gas flow into the space 10 is constant and if the contact surface CS is located at a level where the cross-sectional area of the cavern 1 is relatively small. Therefore, the flow meter 12 should be sufficiently accurate to furnish exact readings even at times when the level of the contact surface in the passage 6 rises or decreases very slowly. As a rule, the flow meter 12 is preferably of the volumetric or positive-displacement type. Satisfactory flow meters of such character are disclosed, for example, on pages 1282–1283 of "Chemical Engineer's Handbook" by John H. Perry (published by McGraw Hill, New York, 3rd Edition, 1950).

Internal friction in a positive-displacement flow meter necessitates a certain pressure differential between the inlet and outlet of the flow meter. Such pressure differential insures that the flow meter is started and remains in operation. Consequently, and when the branch conduit 8a admits liquid gas via a positive-displacement flow meter 12 and valve 11, the level of contact surface in the passage 6 differentiates from (i.e., is located above) the contact surface CS in the cavern 1 by a small increment $\Delta H$. In other words, the exact distance between the ground level G and the contact surface in the passage 6 is $H - \Delta H$. Inversely, when liquid gas is expelled from the cavern 1 by a pump P' which feeds brine through the conduit 4, the distance between the ground level G and the contact surface in the passage 6 will be $H + \Delta H$. When the pump P' is in operation to admit brine through the conduit 4, an equal amount of liquid gas is expelled via feed conduit 8 and can be returned to the source S or to one or more consumers via suitable conduits branching from the conduit 8.

In order to determine the difference ($\pm \Delta H$) between the contact surface CS in the cavern 1 and the contact surface in the passage 6, the improved apparatus further comprises a pressure measuring gage 13 which may be of the type disclosed, for example, on page 1279 of the aforementioned "Chemical Engineer's Handbook." The gage 13 is connected in parallel with the flow meter 12 and the maximal amount of liquid gas which flows through the meter 12 should be small enough to insure that the flow meter will be able to count the amount of liquid gas even if the ratio of the total volume of the space 6 to the volume of the cavern 1 is relatively small, i.e, if the cross-sectional area of the cavern 1 at the momentary level of the contact surface CS is very large and a very small amount of liquid gas flows through the meter 12 while the conduit 8 discharges or admits liquid gas. Such exact operation of the flow meter 12 is insured if the apparatus comprises a control element 14, e.g., an adjustable control valve of the type disclosed on pages 1326–1327 of the "Chemical Engineer's Handbook." Furthermore, the apparatus comprises a flow control element 15 which is installed between the control valve 14 and flow meter 12. The control element 15 may be constituted by a differential mercury manometer and may control the valve 14 in a manner as described in connection with FIG. 254 on page 1333 of the "Chemical Engineer's Handbook." The element 15 controls the valve 14 in such a way that the rate of liquid gas flow cannot exceed a maximum value which is permissible for the flow meter 12. In addition, the valve 14 must be dimensioned in such a way that, in response to a maximum pressure differential (for example, when the shutoff valve 11 is opened after the feed conduit 8 has admitted or evacuated liquid gas from the cavern), the flow meter 12 is not overstressed in response to a maximum rate of liquid gas flow. In other words, the apparatus of my invention is capable of determining the exact level of the contact surface in the passage 6 not only when the valve 11 is opened simultaneously with the valve 9 but also when the valve 11 is opened upon completed admission or evacuation of liquid gas from the cavern 1. Thus, it can happen that an operator desires to determine the distance H after the cavern has been almost entirely filled with liquid gas so that the contact surface CS is located at a level close to the lower end of the conduit 5 while the contact surface in the passage 6 is located at a much higher level because the valve 11 remained closed while the pump P admitted liquid gas via flow meter 7 and valve 9. The operator then simply opens the valve 11 so that a certain amount of liquid gas flows from the conduit 8, via valve 14, control element 15, flow meter 12 and valve 11 until the contact surface in the passage 6 descends to the level of contact surface CS in the cavern 1. The valve 14 must be dimensioned with a view to prevent excessive flow rate through the meter 12 when the cavern 1 is practically filled with liquid gas and the difference $\Delta H$ between the contact surface CS and the contact surface in the passage 6 assumes a maximum value because the cavern 1 was filled with liquid gas while the valve 11 remained closed. The valve 11 could have remained closed due to an oversight. As a rule, the valves 9, 11 and 14 will be open whenever the pump P admits liquid gas to the cavern 1. If the valve 11 remained closed and the operator wishes to determine the distance H subsequent to complete or partial filling of the cavern with liquid gas, the parts 14, 15 perform a "braking" action by controlling the rate of flow through the meter 12 when the valve 11 is set to open position. In other words, the gage 13 determines the pressure differential between the inlet and outlet of the flow meter 12 to facilitate the determination of the increment $\pm \Delta H$, whereas the parts 14, 15 allow for the utilization of a highly sensitive flow meter 12 by insuring that the maximum rate of liquid gas flow through the flow meter 12 cannot exceed a rate which would result in damage to or inaccurate operation of this flow meter.

One end of the gage 13 is connected with the conduit 8a between the flow meter 12 and shutoff valve 11. The other end of this gage is connected with the conduit 8a upstream of the flow meter 12, i.e., this other end communicates also with the feed conduit 8.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be protected by Letters Patent is:

1. An apparatus for locating the contact surface between lighter and heavier fluids in underground caverns wherein first and second conduits respectively extend downwardly into a cavern below and above the surface of the heavier fluid, comprising a third conduit dipping into the heavier fluid and having a predetermined volume, said second and third conduits being arranged to convey lighter fluid and said first conduit being arranged to convey heavier fluid whereby the combined amount of lighter fluid which is admitted into or evacuated from said cavern via said second and third conduits equals the amount of heavier fluid which is evacuated from or admitted into the cavern through said first conduit and the level of contact surface between the fluids in said third conduit at least approximates the level of contact surface in said cavern; and flow meter means for determining the total amount of lighter fluid flowing into or from said third conduit so that the extent to which said third conduit is filled with lighter fluid allows for determination of such levels.

2. An apparatus as set forth in claim 1, wherein said second conduit surrounds with clearance said first and third conduits.

3. An apparatus as set forth in claim 2, wherein said third conduit surrounds with clearance said first conduit.

4. An apparatus as set forth in claim 1, further comprising control means for regulating the rate of flow of lighter fluid through said flow meter means.

5. An apparatus as set forth in claim 4, further comprising a fourth conduit connected with said second conduit and a fifth conduit connecting said third conduit with said fourth conduit, said flow meter means being provided in said fifth conduit, said control means comprising an adjustable valve provided in said fifth conduit between said fourth conduit and said flow meter means and a control element installed in said fifth conduit between said valve and said flow meter means for controlling the rate of flow of lighter fluid through said valve.

6. An apparatus as set forth in claim 5, wherein said control element is a differential manometer.

7. An apparatus as set forth in claim 1, wherein the heavier fluid is brine and the lighter fluid is liquid gas, said cavern being formed in an underground deposit of salt.

8. An apparatus as set forth in claim 7, wherein the level of the lower end of said third conduit at least approximates the level of the lower end of said first conduit.

9. An apparatus as set forth in claim 8, wherein the lower end of said first conduit extends into the bottom zone of brine in said cavern.

10. An apparatus as set forth in claim 7, further comprising second flow meter means for measuring the total amount of liquid gas flowing through said second conduit and shutoff valve means installed between each of said flow meter means and the respective conduits.

11. An apparatus as set forth in claim 7, further comprising means for selectively forcing brine and liquid gas into said cavern via said first conduit and via said second and third conduits, respectively.

12. An apparatus as set forth in claim 7, further comprising a mass of sealing material surrounding said second conduit.

13. An apparatus as set forth in claim 7, wherein said conduits extend above the ground level and said flow meter means is also located above such ground level.

14. An apparatus as set forth in claim 1 further comprising shutoff valve means for permitting or preventing the flow of lighter fluid through said third conduit.

15. An apparatus as set forth in claim 14, further comprising a fourth conduit connected with said second conduit and a fifth conduit connecting said third conduit with said fourth conduit, said flow meter means and said valve means being installed in said fifth conduit.

16. An apparatus as set forth in claim 15, wherein said flow meter means comprises a positive-displacement flow meter wherein a pressure differential develops between the inlet and outlet thereof in response to flow of lighter fluid therethrough, and further comprising a device for determining such pressure differential.

17. An apparatus as set forth in claim 16, wherein said device comprises a pressure measuring gage which is connected in parallel with said flow meter.

18. An apparatus as set forth in claim 17, wherein said gage has two ends one of which communicates with said fifth conduit between said flow meter means and said valve means and the other end of which communicates with said fourth conduit.

References Cited
UNITED STATES PATENTS

| | | | |
|---|---|---|---|
| 2,938,383 | 5/1960 | Blackburn | 61—0.5 X |
| 2,994,200 | 8/1961 | Carpenter | 61—0.5 |
| 3,068,884 | 12/1962 | Naul et al. | 61—0.5 X |
| 3,108,438 | 10/1963 | Harvey | 61—0.5 |

CHARLES E. O'CONNELL, *Primary Examiner.*

DAVID H. BROWN, *Examiner.*